United States Patent [19]

Shail

[11] Patent Number: 4,732,496

[45] Date of Patent: Mar. 22, 1988

[54] TWO-PIECE BALL CAGE FOR BEARING ASSEMBLY

[75] Inventor: Donald J. Shail, Bridgewater, Conn.

[73] Assignee: The Barden Corporation, Danbury, Conn.

[21] Appl. No.: 943,857

[22] Filed: Dec. 18, 1986

Related U.S. Application Data

[63] Continuation of Ser. No. 795,533, Nov. 6, 1985, abandoned.

[51] Int. Cl.$^4$ .............................................. F16C 33/38
[52] U.S. Cl. ..................................... 384/526; 384/530
[58] Field of Search ............... 384/523, 528, 530, 526, 384/524

[56] References Cited

U.S. PATENT DOCUMENTS 3,832,023  8/1974  Fairbank ............................ 384/528
4,451,098  5/1984  Farley et al. .

OTHER PUBLICATIONS

Drawings entitled, "Z611 Retainer (Left Half)", dated Jan. 1966, and "Z611 Retainer (Right Hand)", dated Jan. 1965.

Primary Examiner—Lenard A. Footland
Attorney, Agent, or Firm—Shenier & O'Connor

[57] ABSTRACT

A ball bearing cage consisting of a pair of annular cage portions having opposing surface portions defining circumferentially spaced radial bores for receiving balls. One of the cage portions is formed with a radially outwardly projecting circumferential lip, while the other cage portion is formed with a radially inwardly projecting circumferential lip adapted to interlock with the outwardly projecting lip to prevent axial separation of the cage portions while permitting relative rotational movement thereof.

4 Claims, 4 Drawing Figures

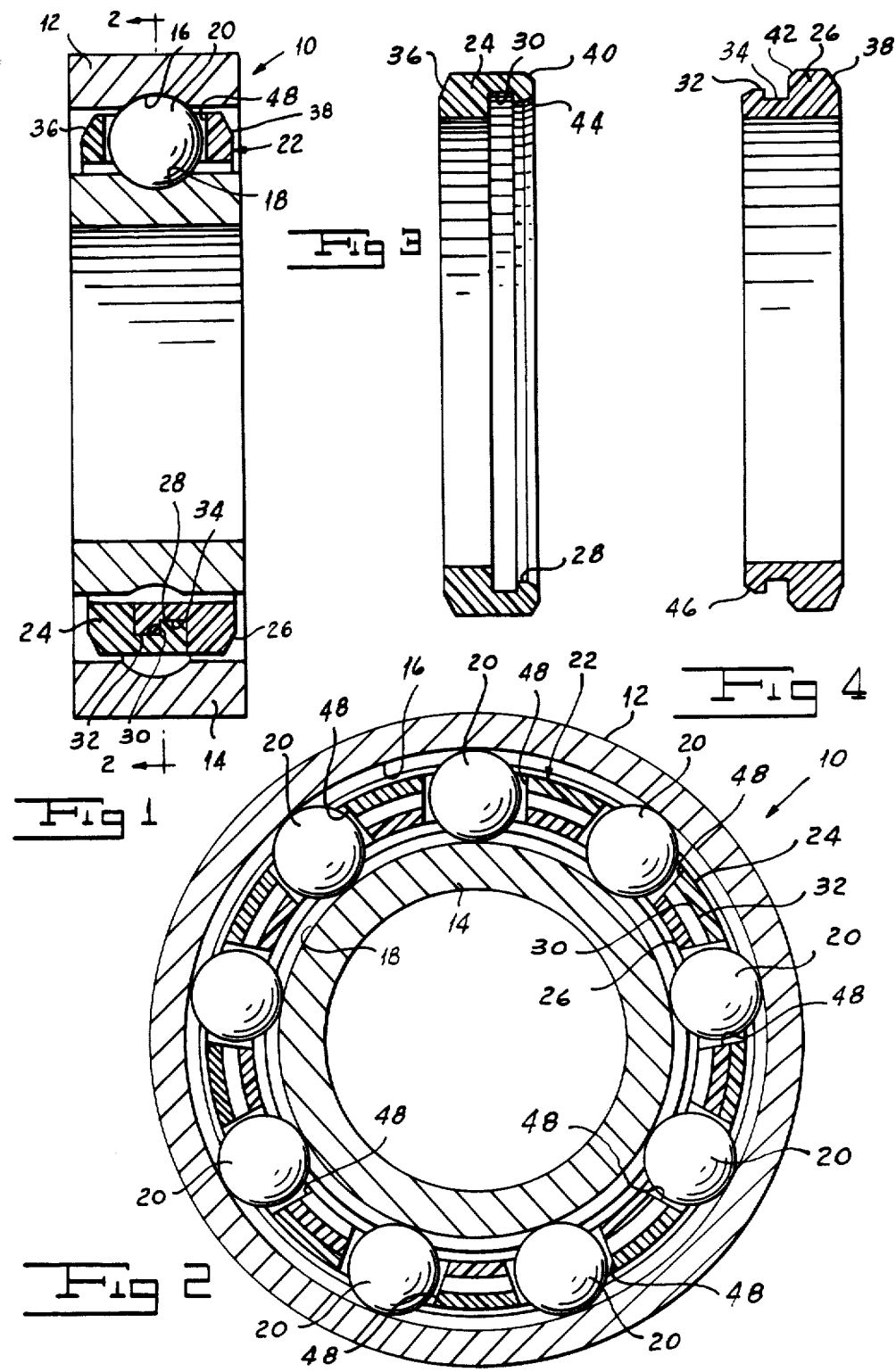

TWO-PIECE BALL CAGE FOR BEARING ASSEMBLY

FIELD OF THE INVENTION

This is a continuation of co-pending application Ser. No. 795,533 filed on Nov. 6, 1985.

My invention relates to a ball cage for a bearing assembly and, more particularly, to such a cage for retaining the balls of a deep-groove bearing.

BACKGROUND OF THE INVENTION

Bearings in which a plurality of balls are disposed at circumferentially spaced locations between the raceways of respective inner and outer rings are well-known in the art. Generally, such bearings employ retainers, or cages, which are disposed between the inner and outer rings at a spacing therefrom for the purpose of maintaining the desired circumferential spacing between the bearing balls. To facilitate assembly of the ball bearing with the balls between the inner and outer rings, these cages are generally formed in two pieces which mate along an interface normal to the axis of the bearing. In the past, side plates, rivets and the like have been used to secure the cage halves together after the bearing balls have been placed in the ball pockets formed in the cage. Not only do such elements entail additional complexity and expense, but such rivets are susceptible to failure, reducing the useful life of the bearing.

Farley et al U.S. Pat. No. 4,451,098 discloses a ball cage formed as two portions, one of which is formed with circumferentially spaced fingers between the ball pockets which engage portions of the mating cage portion to hold the cage portions together. While such an assembly does not require side plates or rivets to hold the cage portions together, it nevertheless has several disadvantages. First, the shape of the ball pockets and retaining fingers is such as to result in a relatively complicated and hence expensive process of fabrication. Second, the disclosed assembly apparently does not permit relative rotational movement between the cage portions. Such movement has been found desirable in preventing the balls from locking in their pockets. Such locking increases bearing torque and decreases the stability of the cage.

SUMMARY OF THE INVENTION

One of the objects of my invention is to provide a ball cage which satisfactorily maintains the desired circumferential spacing between the balls of a deep-groove bearing.

Another object of my invention is to provide a ball cage that readily permits insertion of balls during the assembly of the bearing.

A further object of my invention is to provide a ball cage which does not require rivets or the like to hold the cage portions together.

Still another object of my invention is to provide a ball cage which reduces bearing torque while being stable.

Other and further objects will be apparent from the following description.

In general, my invention contemplates a ball cage comprising a pair of annular cage portions having opposing surface portions defining circumferentially spaced radial bores for receiving balls. One of the cage portions is formed with a radially outwardly projecting circumferential lip, while the other cage portion is formed with a radially inwardly projecting circumferential lip adapted to interlock with the outwardly projecting lip to prevent axial separation of the cage portions while permitting relative rotational movement thereof.

BRIEF DESCRIPTION OF THE DRAWINGS

In the drawings to which reference is made in the following specification and in which like reference numerals are used to indicate like parts in the various views:

FIG. 1 is a section of a bearing assembly incorporating my ball cage.

FIG. 2 is a section of the bearing assembly shown in FIG. 1, taken along line 2—2 thereof.

FIG. 3 is a section of one portion of the cage of the bearing assembly shown in FIG. 1, in an intermediate stage of construction.

FIG. 4 is a section of the mating portion of the cage of the bearing assembly shown in FIG. 1, also in an intermediate stage of construction.

DESCRIPTION OF THE PREFERRED EMBODIMENT

Referring first to FIGS. 1 and 2, a bearing assembly, indicated generally by the reference numeral 10, incorporating my ball cage includes an outer ring 12, which may be received in a housing (not shown), and an inner ring 14 which may receive a shaft (not shown). The inner surface of outer ring 12 and the outer surface of inner ring 14 are formed with respective circumferentially extending indentations, or raceways, 16 and 18 for receiving bearing balls 20. In the embodiment shown in FIGS. 1 and 2, nine such balls 20 are used, with an angular spacing of 40° between each adjacent pair of balls. As will be apparent from the foregoing description, balls 20, by rolling relative to outer ring raceway 16 and inner ring raceway 18, permit relative rotational movement of rings 12 and 14 without any sliding movement therebetween. Preferably, the radius of curvature of the cross-sections of raceways 16 and 18 is slightly greater than the radius of balls 20 to minimize any friction between the balls 20 and the lateral edge portions of the raceways.

A bearing cage indicated generally by the reference numeral 22 is used to maintain the desired angular separation between adjacent balls 20. Cage 22, which is preferably formed of a suitable resilient plastic material such as phenolic resin, is formed with radial bores, or ball pockets, 48 circumferentially spaced at 40° angular intervals for receiving the balls 20. For the sake of clarity, only the topmost ball 20 and bore 48 are shown in FIG. 1. Preferably, the diameter of bores 48 is slightly greater than that of the balls 20 to prevent seizing. In accordance with my invention, cage 22 is formed of a first, or female, half 24 and a second, or male, half 26 which interlock as shown in FIG. 1. More particularly, I form a counterbored portion of cage half 24 with an inwardly projecting lip 28 adapted to interlock with an outwardly projecting lip 32 formed on a reduced portion of cage half 26. Lip 28 fits into a groove 34 defined by lip 32 and the main poriton of cage half 26, while lip 32 fits into a groove 30 defined by lip 28 and the main porfion of cage half 24.

Referring also to FIGS. 3 and 4, the remote outside shoulder portions of cage halves 24 and 26 are preferably formed with respective bevels 36 and 38, while the adjacent outside shoulder portions are formed with somewhat smaller bevels 40 and 42, respectively (not shown in FIG. 1). In addition, the outboard shoulder portions of lips 28 and 32 are formed with respective bevels 44 and 46 (not shown in FIG. 1), preferably at an angle of about 20° relative to the axis of bearing 10, to facilitate snapping the cage halves together.

In making the bearing cage 22, the cage halves 24 and 26 are first formed, preferably by machining, as shown in FIGS. 3 and 4, respectively, without the radial bores 48. The cage halves are then snapped together so that lip 32 fits within groove 30 while lip 28 fits within groove 34. Preferably, the clearance between adjacent portions of cage halves 24 and 26 is such as to permit relative rotation of the halves. The bores 48 are then drilled with the cage halves 24 and 26 snapped together. Preferably, the axes of the bores 48 lie in a plane which includes the interface between lips 32 and 28, as shown in FIG. 1. As shown in FIG. 2 for lip 32, this operation reduces lips 28 and 32 to a plurality of circumferentially spaced sections extending between adjacent bores 48, with gaps between adjacent sections that are greater than the length of a section.

After the bores 48 have been formed in this manner, one of the cage halves 24 and 26 is rotated through an angular displacement of 20° relative to the other cage half to permit the cage halves to be separated axially, the diameter of bores 48 being such that this is possible. The cage 22 is then assembled into the bearing 10 by inserting one cage half 24 or 26 into the bearing 10, after the balls 20 have been inserted in raceways 16 and 18, and snapping the other cage half over it with the balls 20 in the pockets 48.

It will be seen that I have accomplished the objects of my invention. My ball cage satisfactory maintains the desired circumferential spacing between the balls of a deep-groove bearing. My ball cage readily permits insertion of balls during the assembly of the bearing, and does not require rivets or the like to hold the cage poritons together. Finally, my ball cage reduces bearing torque while being stable.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A ball cage including in combination a pair of cage portions having opposing generally semicylindrical recesses defining circumferentially spaced radial bores for receiving balls and having means defining mating surface portions extending between said bores, said bores having their axes in a plane, the mating surface portions of one of said cage portions being formed with means defining radially outwardly projecting circumferentially extending lip sections, the mating surface portions of the other of said cage portions being formed with radially inwardly projecting circumferential lip sections adapted to interlock with said outwardly projecting lip sections to prevent axial separation of said cage portions while permitting relative rotational movement thereof, said lip sections projecting predetermined distances beyond said plane from opposite sides thereof, said distances each being less than the radius of said bores and being such as to permit balls substantially of the diameter of said bores to be inserted axially into the recesses of one of said cage portions and to permit the other of said cage portions then to be mated with said one cage portion with said balls in said bores.

2. A ball cage as in claim 1 in which the spacing between adjacent lip sections of a cage is greater than the length of one of said lip sections, whereby said cage portions may be separated axially by rotating the lip sections of one cage portion out of alignment with the lip sections of the other cage portion.

3. A ball cage as in claim 1 in which said inwardly projecting lip sections and said outwardly projecting lip sections have an interface in said plane.

4. A ball cage as in claim 1 in which said cage portions are of uniform axial cross-section except for said bores.

* * * * *

UNITED STATES PATENT AND TRADEMARK OFFICE
CERTIFICATE OF CORRECTION

PATENT NO. : 4,732,496
DATED : March 22, 1988
INVENTOR(S) : Donald J. Shail

It is certified that error appears in the above-identified patent and that said Letters Patent are hereby corrected as shown below:

Col. 4, Claim 2, line 2:

after "cage" insert --portion--.

Signed and Sealed this

Fifth Day of July, 1988

Attest:

DONALD J. QUIGG

Attesting Officer

Commissioner of Patents and Trademarks